US008266182B2

(12) United States Patent
Wanigasekara-Mohotti et al.

(10) Patent No.: US 8,266,182 B2
(45) Date of Patent: Sep. 11, 2012

(54) TRANSCODING FOR A DISTRIBUTED FILE SYSTEM (75) Inventors: Don H. Wanigasekara-Mohotti, Santa Clara, CA (US); Donald M. Craig, Cupertino, CA (US)

(73) Assignee: Harmonic Inc., San Jose, CA (US)

( * ) Notice: Subject to any disclaimer, the term of this patent is extended or adjusted under 35 U.S.C. 154(b) by 1193 days.

(21) Appl. No.: 11/479,536

(22) Filed: Jun. 30, 2006

(65) Prior Publication Data
US 2008/0001791 A1 Jan. 3, 2008

(51) Int. Cl.
*G06F 17/30* (2006.01)
(52) U.S. Cl. .......... 707/796; 707/803; 707/809
(58) Field of Classification Search .......... 707/695
See application file for complete search history.

(56) References Cited

U.S. PATENT DOCUMENTS

| 5,659,786 | A | 8/1997 | George et al. |
| 6,407,680 | B1 | 6/2002 | Lai et al. |
| 6,593,860 | B2 | 7/2003 | Lai et al. |
| 6,888,477 | B2 | 5/2005 | Lai et al. |
| 7,120,654 | B2 * | 10/2006 | Bromley .......... 1/1 |
| 7,448,062 | B1 * | 11/2008 | Bloch et al. .......... 725/93 |
| 2003/0001964 | A1 | 1/2003 | Masukura et al. |
| 2003/0158913 | A1 * | 8/2003 | Agnoli et al. .......... 709/219 |
| 2003/0172186 | A1 * | 9/2003 | Dunn et al. .......... 709/246 |
| 2003/0187859 | A1 | 10/2003 | Belov |
| 2003/0187860 | A1 | 10/2003 | Holland |
| 2003/0187866 | A1 | 10/2003 | Zelenka |
| 2003/0187883 | A1 | 10/2003 | Zelenka et al. |
| 2004/0078633 | A1 | 4/2004 | Holland |
| 2004/0199665 | A1 * | 10/2004 | Omar et al. .......... 709/238 |
| 2005/0182772 | A1 * | 8/2005 | Mital et al. .......... 707/100 |
| 2005/0204393 | A1 * | 9/2005 | Bopardikar et al. .......... 725/81 |
| 2007/0091928 | A1 * | 4/2007 | Wee et al. .......... 370/474 |
| 2007/0282868 | A1 * | 12/2007 | Wanigasekara-Mohotti et al. .......... 707/100 |
| 2008/0320151 | A1 * | 12/2008 | McCanne et al. .......... 709/228 |

FOREIGN PATENT DOCUMENTS

| GB | 0 356 535 | 5/2001 |
| WO | WO 2006/025322 A1 | 3/2006 |

OTHER PUBLICATIONS

S. Ghemawat et al., "The Google File System," SOSP '03, Association for Computing Machinery, Oct. 19, 2003, 15 pages.
D. Craig et al., "Omneon Spectrum Media Server Architecture Whitepaper," Omneon Video Networks, May 2004, 12 pages.
I. Sylvester, "IDC Executive Brief Transcoding: The Future of the Video Market Depends on It," IDC, Framingham, MA, Nov. 2006, 8 pages.
Anonymous, "Omneon ProBrowse System," May 2007, 2 pages.
Anonymous, "New to grid computing," IBM Corporation, downloaded Sep. 24, 2007, 9 pages.

(Continued)

*Primary Examiner* — Baoquoc To
(74) *Attorney, Agent, or Firm* — Hickman Palermo Truong Becker Bingham Wong LLP (57) ABSTRACT

A method for transcoding a file on a distributed file system is described. The distributed file system stores portions of the file across a plurality of distinct physical storage locations. A request to transcode the file is received. The file is transcoded from a first format to a second format using a processing unit of at least one of the physical storage locations.

23 Claims, 7 Drawing Sheets

OTHER PUBLICATIONS

V. Berstis, "Redbooks Paper Fundamentals of Grid Computing," IBM Corporation, 2002, 28 pages.

European Patent Office, "International Search Report", International application No. PCT/US2007/013980, 16 pages.

Claims, International application No. PCT/US2007/013980, 3 pages.

Sambe, Yasuo, et al., "Distributed Video Transcoding and its Application to Grid Delivery", The 9th Asia-Pacific Conference on Sep. 21-24, 2003, APCC 2003, IEEE vol. 1, Sep. 21, 2003, XP010688022, ISBN: 0-7803-8114-9, 5 pages.

Guo, Jiani, et al., "Load Sharing in a Transcoding Cluster", Distributed Computing—IWDC 2003, 5th International Workshop Proceedings, Dec. 30, 2003, XP-019002165, Lecture Notes in Computer Science vol. 2918, 10 pages.

* cited by examiner

TRANSCODING FOR A DISTRIBUTED FILE SYSTEM

TECHNICAL FIELD

An embodiment of the invention is generally directed to electronic data storage systems, and more particularly to scalable data storage systems.

BACKGROUND

In today's information intensive environment, there are many businesses and other institutions that need to store huge amounts of digital data. These include entities such as large corporations that store internal company information to be shared by thousands of networked employees; online merchants that store information on millions of products; and libraries and educational institutions with extensive literature collections. A more recent need for the use of large-scale data storage systems is in the broadcast television programming market. Such businesses are undergoing a transition, from the older analog techniques for creating, editing and transmitting television programs, to an all-digital approach. Not only is the content (such as a commercial) itself stored in the form of a digital video file, but editing and sequencing of programs and commercials, in preparation for transmission, are also digitally processed using powerful computer systems. Other types of digital content that can be stored in a data storage system include seismic data for earthquake prediction, and satellite imaging data for mapping.

To help reduce the overall cost of the storage system, a distributed architecture is used. Hundreds of smaller, relatively low cost, high volume manufactured disk drives (currently each disk drive unit has a capacity of one hundred or more Gbytes) may be networked together, to reach the much larger total storage capacity. However, this distribution of storage capacity also increases the chances of a failure occurring in the system that will prevent a successful access. Such failures can happen in a variety of different places, including not just in the system hardware (e.g., a cable, a connector, a fan, a power supply, or a disk drive unit), but also in software such as a bug in a particular client application program. Storage systems have implemented redundancy in the form of a redundant array of inexpensive disks (RAID), so as to service a given access (e.g., make the requested data available), despite a disk failure that would have otherwise thwarted that access. The systems also allow for rebuilding the content of a failed disk drive, into a replacement drive.

With respect to stored audio/video content, a transcoding hardware separate from the storage hardware is used to transcode the audio/video content. Such external transcoding hardware creates a bottleneck when moving audio/video data between a storage system and the transcoding system resulting in poor performance.

BRIEF DESCRIPTION OF THE DRAWINGS

The present invention is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of the present invention include various operations, which will be described below. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

In an embodiment, a program storage device readable by a machine tangibly embodies a program of instructions executable by the machine to perform a method for transcoding a file of a distributed file system. The method may comprise receiving a request to transcode the file, the distributed file system storing portions of the file across a plurality of distinct physical storage locations and transcoding the file from a first format to a second format using a processing unit of at least one of the physical storage locations. The method may further comprise storing the file with the second format in the distributed file system, receiving the request from a client, and sending the transcoded file to the client.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Embodiments of a method and apparatus are described to notify one or more applications coupled to a data storage system of a change to a file or an addition of a new file. In one embodiment, the notification system of the distributed file system communicates with one or more applications.

Figure 1:
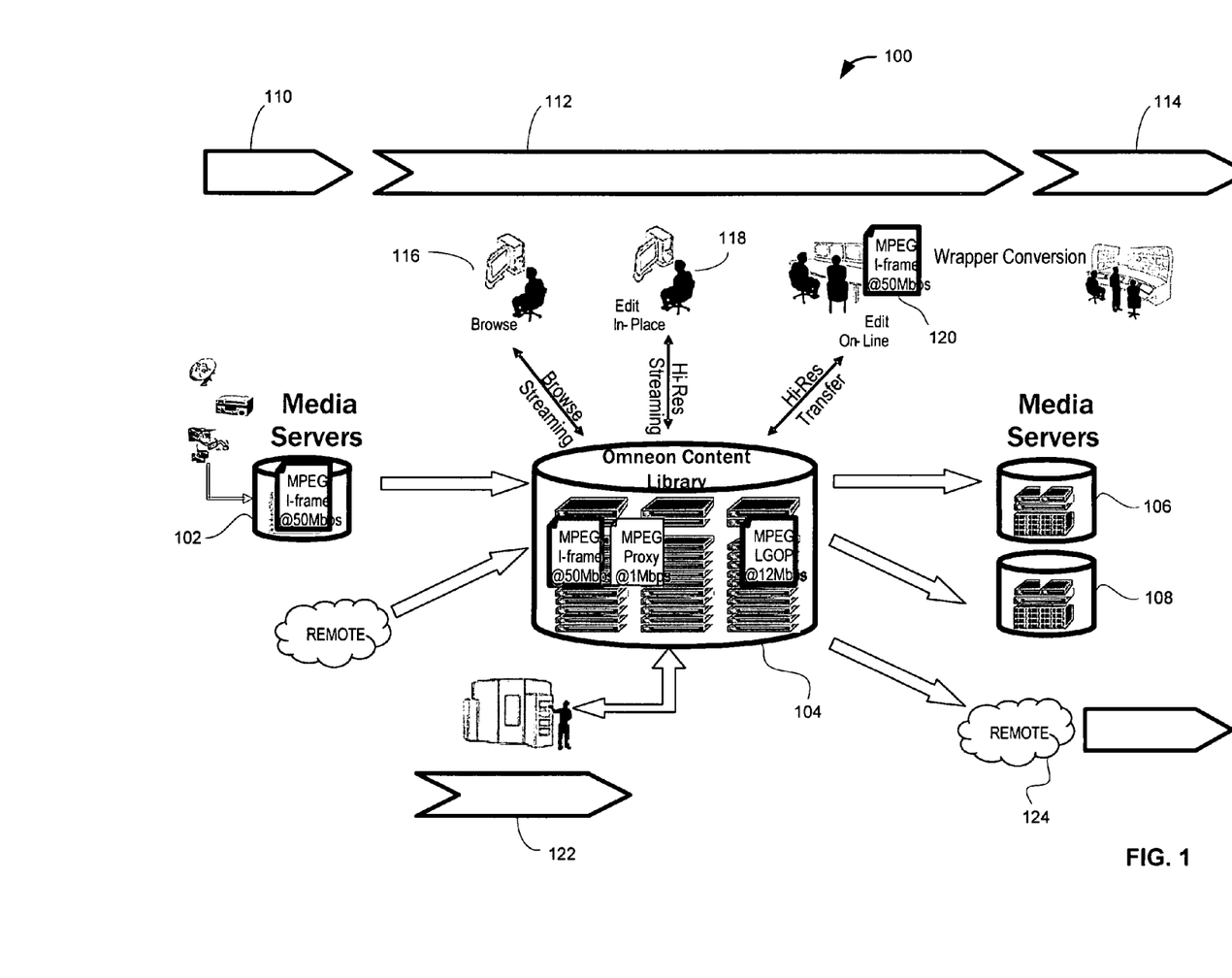
FIG. 1 shows a data storage system, in accordance with an embodiment of the invention, in use as part of a video processing environment.

FIG. 1 illustrates one embodiment of a data storage system 100 in use as part of a video processing environment. It should be noted, however, that the data storage system 100 as well as its components or features described below can alternatively be used in other types of applications (e.g., a literature library; seismic data processing center; merchant's product catalog; central corporate information storage; etc.) The data storage system 100 provides data protection, as well as hardware and software fault tolerance and recovery.

The data storage system 100 includes media servers 102 and a content library 104. Media servers 102, 106, 108 may be composed of a number of software components that are running on a network of server machines. The server machines communicate with the content library 104 including mass storage devices such as rotating magnetic disk drives that store the data. The server machines accept requests to create, write or read a file, and manages the process of transferring data into one or more disk drives in the content library 104, or delivering requested read data from them. The server machines keep track of which file is stored in which drive. Requests to access a file, i.e. create, write, or read, are typically received from what is referred to as a client application program that may be running on a client machine connected to the server network. For example, the application program may be a video editing application running on a workstation of a television studio, that needs a particular video clip (stored as a digital video file in the system).

Video data is voluminous, even with compression in the form of, for example, Motion Picture Experts Group (MPEG) formats. Accordingly, data storage systems for such environments are designed to provide a storage capacity of at least tens of terabytes or greater. Also, high-speed data communication links are used to connect the server machines of the network, and in some cases to connect with certain client machines as well, to provide a shared total bandwidth of one hundred Gb/second and greater, for accessing the data storage system 100. The storage system is also able to service accesses by multiple clients simultaneously.

The data storage system 100 can be accessed using client machines that can take a variety of different forms. For example, content files (in this example, various types of digital media files including MPEG and high definition (HD)) can be requested by media server 102 which as shown in FIG. 1 can interface with standard digital video cameras, tape recorders, and a satellite feed during an "ingest" phase 110 of the media processing. As an alternative, the client machine may be on a remote network, such as the Internet. In a "production" phase 112, stored files can be streamed to client machines for browsing 116, editing 118, and archiving 120. Modified files may then be sent to media servers 106, 108 or directly through a remote network 124 for distribution, during a "playout" phase 114.

The data storage system 100 provides a relatively high performance, high availability storage subsystem with an architecture that may prove to be particularly easy to scale as the number of simultaneous client accesses increase or as the total storage capacity requirement increases. The addition of media servers 102, 106, 108 (as in FIG. 1) and a content gateway (not shown) enables data from different sources to be consolidated into a single high performance/high availability system, thereby reducing the total number of storage units that a business must manage. In addition to being able to handle different types of workloads (including different sizes of files, as well as different client loads), an embodiment of the system may have features including automatic load balancing, a high speed network switching interconnect, data caching, and data replication. According to an embodiment, the data storage system 100 scales in performance as needed from 20 Gb/second on a relatively small, or less than 66 terabyte system, to over several hundred Gb/second for larger systems, that is, over 1 petabyte. For a directly connected client, this translates into, currently, a minimum effective 60 megabyte per second transfer rate, and for content gateway attached clients, a minimum 40 megabytes per second. Such numbers are, of course, only examples of the current capability of the data storage system 100, and are not intended to limit the full scope of the invention being claimed.

In accordance with an embodiment, the data storage system 100 may be designed for non-stop operation, as well as allowing the expansion of storage, clients and networking bandwidth between its components, without having to shutdown or impact the accesses that are in process. The data storage system 100 preferably has sufficient redundancy that there is no single point of failure. Data stored in the content library 104 has multiple replications, thus allowing for a loss of mass storage units (e.g., disk drive units) or even an entire server, without compromising the data. In the different embodiments of the invention, data replication, for example, in the event of a disk drive failure, is considered to be relatively rapid, and without causing any noticeable performance degradation on the data storage system 100 as a whole. In contrast to a typical RAID system, a replaced drive unit of the data storage system 100 may not contain the same data as the prior (failed) drive. That is because by the time a drive replacement actually occurs, the re-replication process will already have started re-replicating the data from the failed drive onto other drives of the system 100.

In addition to mass storage unit failures, the data storage system 100 may provide protection against failure of any larger, component part or even a complete component (e.g., a metadata server, a content server, and a networking switch). In larger systems, such as those that have three or more groups of servers arranged in respective enclosures or racks as described below, the data storage system 100 should continue to operate even in the event of the failure of a complete enclosure or rack.

Figure 2:
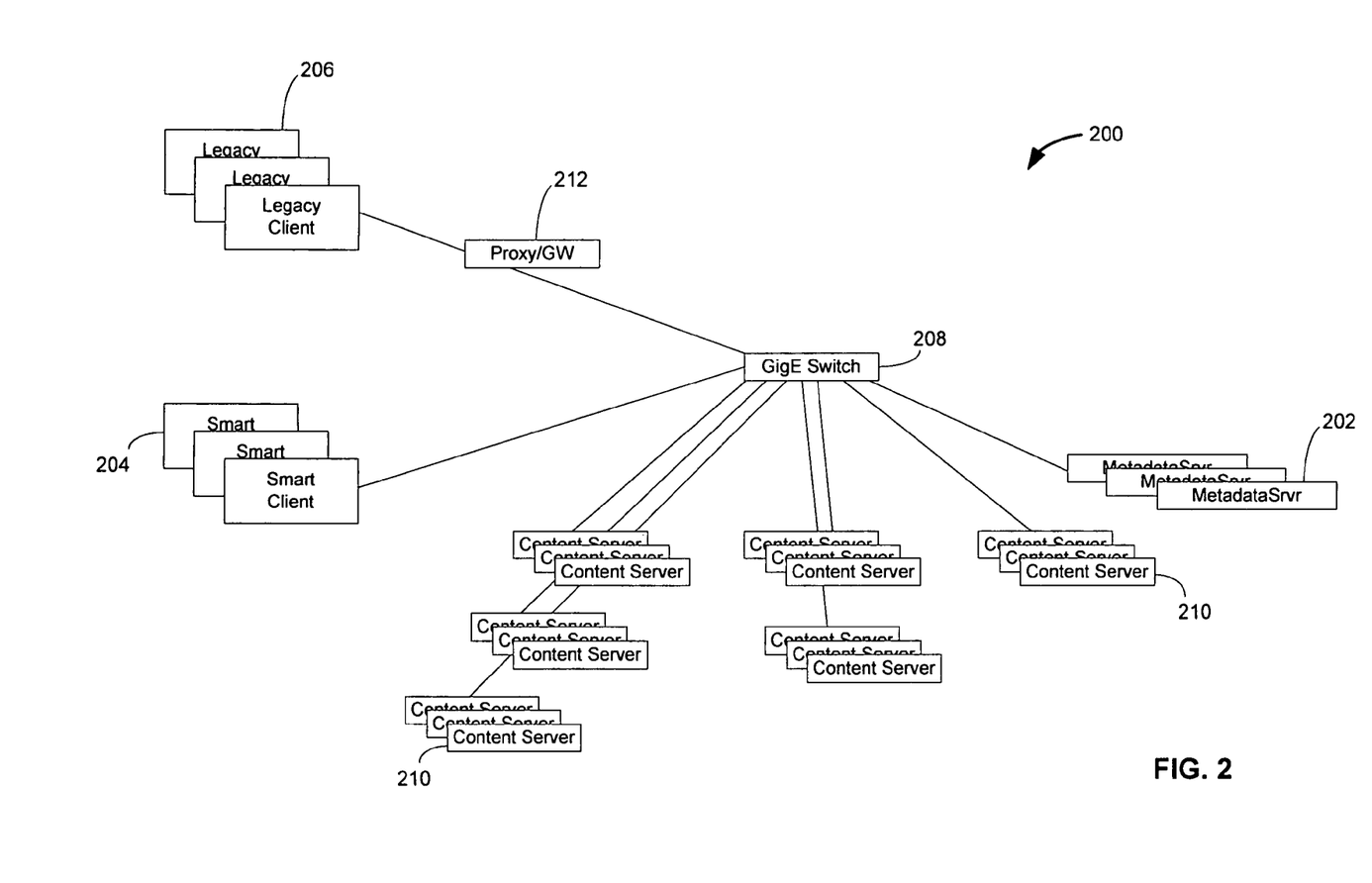
FIG. 2 shows a system architecture for the data storage system, in accordance with one embodiment.

Referring now to FIG. 2, a system architecture for a data storage system 200 connected to multiple clients is shown, in accordance with an embodiment of the invention. The system 200 has a number of metadata server machines 202, each to store metadata for a number of files that are stored in the system 200. Software running in such a machine is referred to as a metadata server 202 or a content director 202. The metadata server 202 is responsible for managing operation of the system 200 and is the primary point of contact for clients 204 and 206. Note that there are two types of clients illustrated, a smart client 204 and a legacy client 206.

The smart client 204 has knowledge of the proprietary network protocol of the system 200 and can communicate directly with the content servers 210 behind the networking fabric (here a Gb Ethernet switch 208) of the system 200. The switch 208 acts as a selective bridge between content servers 210 and metadata server 202 as illustrated in FIG. 2.

The other type of client is a legacy client 206 that does not have a current file system driver (FSD) installed, or that does not use a software development kit (SDK) that is currently provided for the system 200. The legacy client 206 indirectly communicates with content servers 210 behind the Ethernet switch 208 through a proxy or a content gateway 212, as shown, via an open networking protocol that is not specific to the system 200. The content gateway 212 may also be referred to as a content library bridge 212.

The file system driver or FSD is a software that is installed on a client machine, to present a standard file system interface, for accessing the system 200. On the other hand, the software development kit or SDK allows a software developer to access the system 200 directly from an application program. This option also allows system specific functions, such as the replication factor setting to be described below, to be available to the user of the client machine.

In the system 200, files are typically divided into slices when stored. In other words, the parts of a file are spread across different disk drives located within content servers. In a current embodiment, the slices are preferably of a fixed size and are much larger than a traditional disk block, thereby permitting better performance for large data files (e.g., currently 8 Mbytes, suitable for large video and audio media files). Also, files are replicated in the system 200, across different drives within different content servers, to protect against hardware failures. This means that the failure of any one drive at a point in time will not preclude a stored file from being reconstituted by the system 200, because any missing slice of the file can still be found in other drives. The replication also helps improve read performance, by making a file accessible from more servers. To keep track of what file is stored where (or where are the slices of a file stored), the system 200 has a metadata server program that has knowledge of metadata (information about files) which includes the mapping between a file name and its slices of the files that have been created and written to.

The metadata server 202 determines which of the content servers 210 are available to receive the actual content or data for storage. The metadata server 202 also performs load balancing, that is determining which of the content servers 210 should be used to store a new piece of data and which ones should not, due to either a bandwidth limitation or a particular content server filling up. To assist with data availability and data protection, the file system metadata may be replicated multiple times. For example, at least two copies may be stored on each metadata server 202 (and, for example, one on each hard disk drive unit). Several checkpoints of the metadata should be taken at regular time intervals. It is expected that on most embodiments of the system 200, only a few minutes of time may be needed for a checkpoint to occur, such that there should be minimal impact on overall system operation.

In normal operation, all file accesses initiate or terminate through a metadata server 202. The metadata server 202 responds, for example, to a file open request, by returning a list of content servers 210 that are available for the read or write operations. From that point forward, client communication for that file (e.g., read; write) is directed to the content servers 210, and not the metadata servers 202. The SDK and FSD, of course, shield the client 204, 206 from the details of these operations. As mentioned above, the metadata servers 202 control the placement of files and slices, providing a balanced utilization of the content servers.

In accordance with another embodiment, a system manager (not shown) may also be provided, for instance on a separate rack mount server machine, for configuring and monitoring the system 200.

The connections between the different components of the system 200, that is the content servers 210 and the metadata servers 202, should provide the necessary redundancy in the case of a network interconnect failure.

Figure 3A:
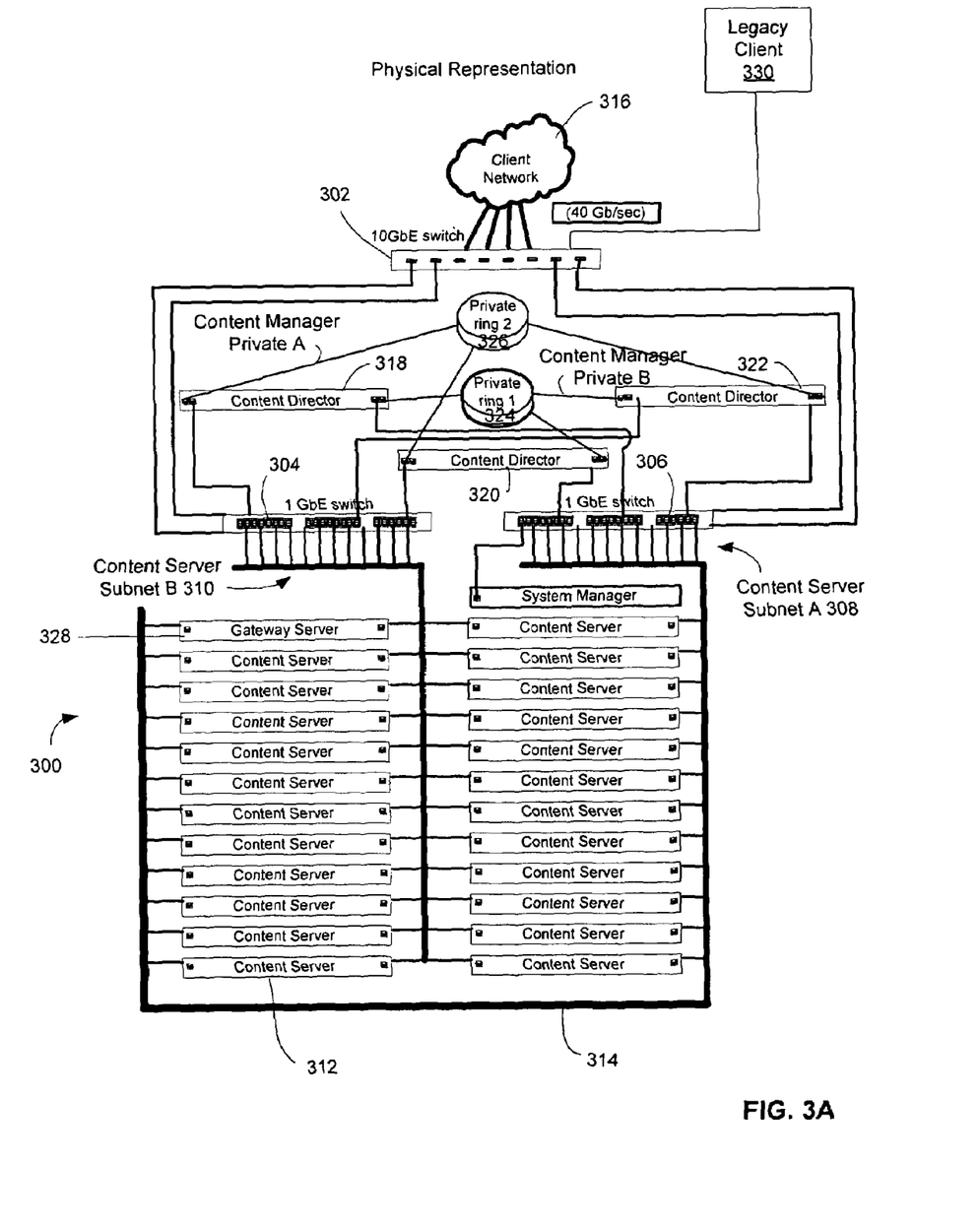
FIGS. 3A and 3B show a network topology for an embodiment of the data storage system.
Figure 3B:
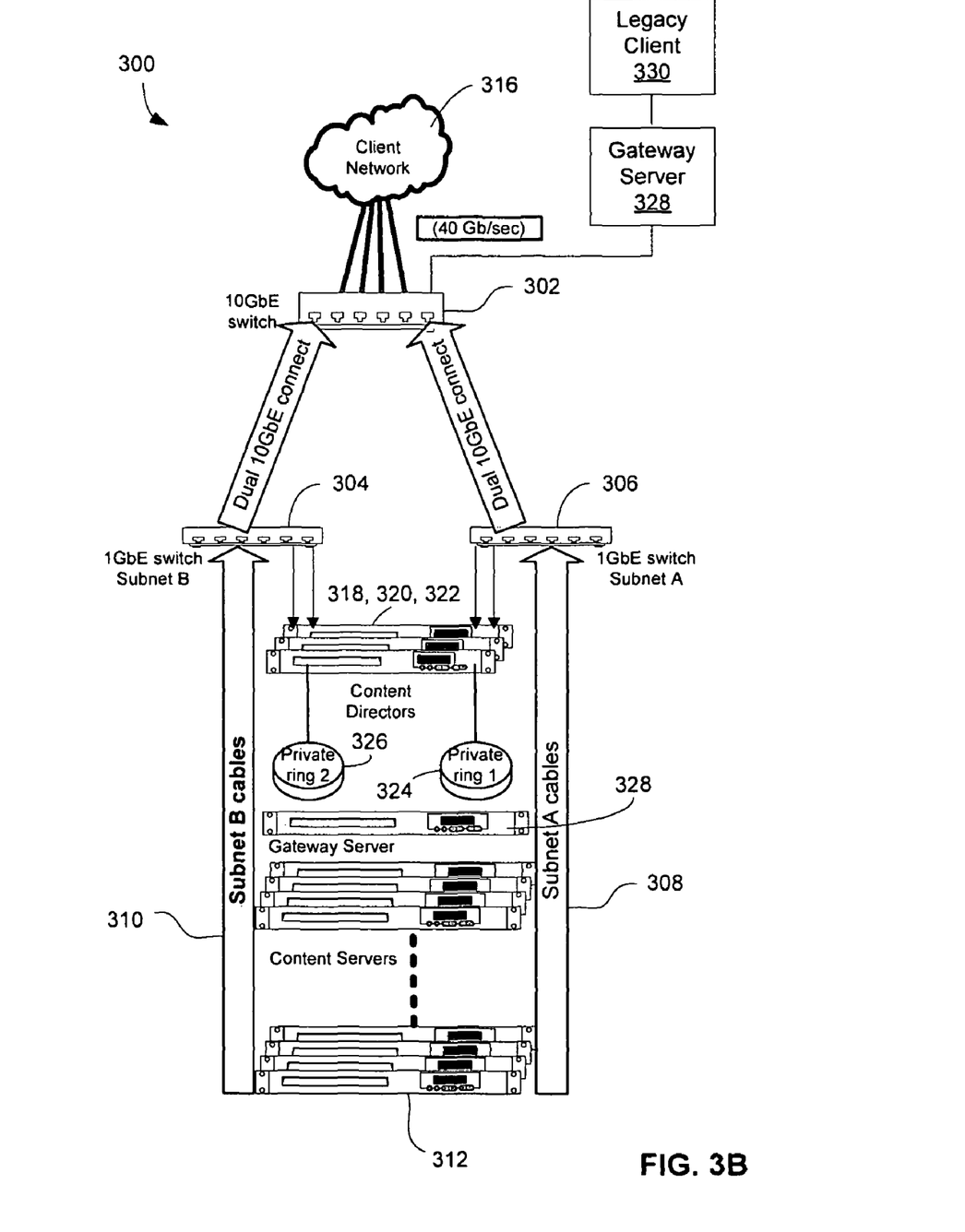

FIG. 3A illustrates a physical network topology for a relatively small data storage system 300. FIG. 3B illustrates a logical network topology for the data storage system 300. The connections are preferably Gb Ethernet across the entire system 300, taking advantage of wide industry support and technological maturity enjoyed by the Ethernet standard. Such advantages are expected to result in lower hardware costs, wider familiarity in the technical personnel, and faster innovation at the application layers. Communications between different servers of the OCL system preferably uses current, Internet protocol (IP) networking technology. However, other network switching interconnects may alternatively be used, so long as they provide the needed speed of switching packets between the servers.

A networking switch 302 automatically divides a network into multiple segments, acts as a high-speed selective bridge between the segments, and supports simultaneous connections of multiple pairs of computers which may not compete with other pairs of computers for network bandwidth. It accomplishes this by maintaining a table of each destination address and its port. When the switch 302 receives a packet, it reads the destination address from the header information in the packet, establishes a temporary connection between the source and destination ports, sends the packet on its way, and may then terminate the connection.

The switch 302 can be viewed as making multiple temporary crossover cable connections between pairs of computers. High-speed electronics in the switch automatically connect the end of one cable (source port) from a sending computer to the end of another cable (destination port) going to the receiving computer on a per packet basis. Multiple connections like this can occur simultaneously.

In the example topology of FIGS. 3A and 3B, multi Gb Ethernet switches 302, 304, 306 are used to provide connections between the different components of the system 300. FIGS. 3A & 3B illustrate 1 Gb Ethernet 304, 306 and 10 Gb Ethernet 302 switches allowing a bandwidth of 40 Gb/second available to the client. However, these are not intended to limit the scope of the invention as even faster switches may be used in the future. The example topology of FIGS. 3A and 3B has two subnets, subnet A 308 and subnet B 310 in which the content servers 312 are arranged. Each content server has a pair of network interfaces, one to subnet A 308 and another to subnet B 310, making each content server accessible over either subnet 308 or 310. Subnet cables 314 connect the content servers 312 to a pair of switches 304, 306, where each switch has ports that connect to a respective subnet. The subnet cables 314 may include, for example, Category 6 cables. Each of these 1 Gb Ethernet switches 304, 306 has a dual 10 Gb Ethernet connection to the 10 Gb Ethernet switch 302 which in turn connects to a network of client machines 316.

In accordance with one embodiment, a legacy client 330 communicates with a gateway server 328 through the 10 Gb Ethernet switch 302 and the 1 Gb Ethernet switch 304. The gateway server 328 acts as a proxy for the legacy client 330 and communicates with content servers 312 via the 1 GbE switch 306.

In this example, there are three content directors 318, 320, 322 each being connected to the 1 Gb Ethernet switches 304, 306 over separate interfaces. In other words, each 1 Gb Ethernet switch 304, 306 has at least one connection to each of the three content directors 318, 320, 322. In addition, the networking arrangement is such that there are two private networks referred to as private ring 1 324 and private ring 2 326, where each private network has the three content directors 318, 320, 322 as its nodes. Those of ordinary skills in the art will recognize that the above private networks refer to dedicated subnet and are not limited to private ring networks. The content directors 318, 320, 322 are connected to each other with a ring network topology, with the two ring networks providing redundancy. The content directors 318, 320, 322 and content servers 312 are preferably connected in a mesh network topology (see U.S. patent application entitled "Logical and Physical Network Topology as Part of Scalable Switching Redundancy and Scalable Internal and Client Bandwidth Strategy", by Donald Craig, et al.—P020). An example physical implementation of the embodiment of FIG. 3A would be to implement to each content server 312 as a separate server blade, all inside the same enclosure or rack. The Ethernet switches 302, 304, 306, as well as the three content directors 318, 320, 322 could also be placed in the same rack. The invention is, of course, not limited to a single rack embodiment. Additional racks filled with content servers, content directors and switches may be added to scale the system 300.

Figure 4:
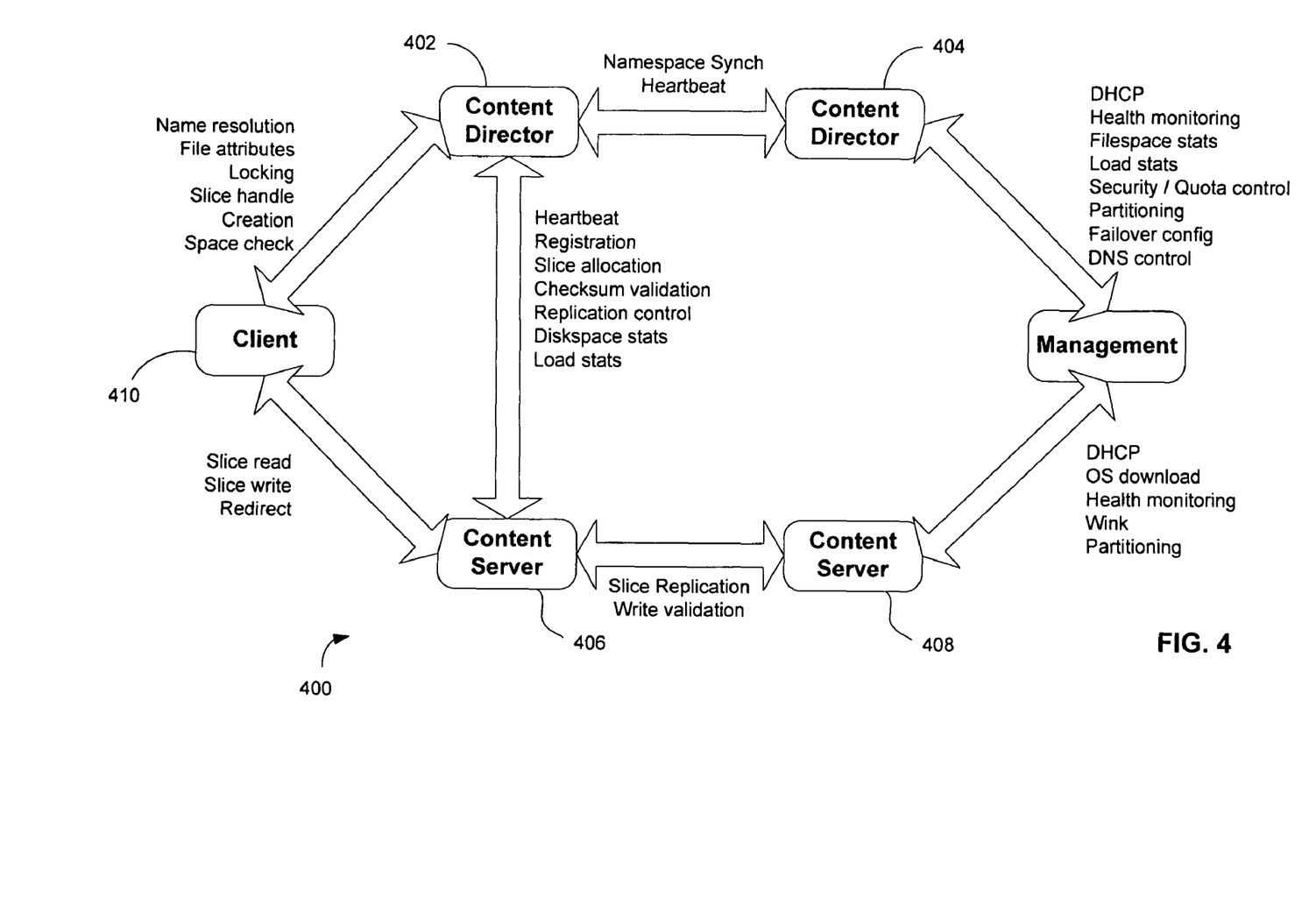
FIG. 4 shows a software architecture for the data storage system, in accordance with one embodiment.

Turning now to FIG. 4, an example software architecture 400 for the system 200 is depicted. The system 200 has a distributed file system program that is to be executed in the metadata server machines 402, 404, the content server machines 406, 408, and the client machines 410, to hide complexity of the system 200 from a number of client machine users. In other words, users can request the storage and retrieval of, in this case, audio and/or video information though a client program, where the file system makes the system 200 appear as a single, simple storage repository to the user. A request to create, write, or read a file is received from a network-connected client 410, by a metadata server 402, 404. The file system software or, in this case, the metadata server portion of that software, translates the full file name that has been received, into corresponding slice handles, which point to locations in the content servers where the constituent slices of the particular file have been stored or are to be created. The actual content or data to be stored is presented to the content servers 406, 408 by the clients 410 directly. Similarly, a read operation is requested by a client 410 directly from the content servers 406, 408.

Each content server machine 406, 408 may have one or more local mass storage units, e.g. rotating magnetic disk drive units, and manages the mapping of a particular slice onto its one or more drives. In addition, in the preferred embodiment, replication operations are controlled at the slice level. The content servers 406, 408 communicate with one another to achieve slice replication and obtaining validation of slice writes from each other, without involving the client.

In addition, since the file system is distributed amongst multiple servers, the file system may use the processing power of each server (be it a content server 406, 408, a client 410, or a metadata server 402, 404) on which it resides. As described below in connection with the embodiment of FIG. 4, adding a content server to increase the storage capacity automatically increases the total number of network interfaces in the system, meaning that the bandwidth available to access the data in the system also automatically increases. In addition, the processing power of the system as a whole also increases, due to the presence of a central processing unit and associated main memory in each content server. Such scaling factors suggest that the system's processing power and bandwidth may grow proportionally, as more storage and more clients are added, ensuring that the system does not bog down as it grows larger.

The metadata servers 402, 404 may be considered to be active members of the system 200, as opposed to being an inactive backup unit. This allows the system 200 to scale to handling more clients, as the client load is distributed amongst the metadata servers 402, 404. As a client load increases even further, additional metadata servers can be added.

According to an embodiment of the invention, the amount of replication (also referred to as "replication factor") is associated individually with each file. All of the slices in a file preferably share the same replication factor. This replication factor can be varied dynamically by the user. For example, the system's application programming interface (API) function for opening a file may include an argument that specifies the replication factor. This fine grain control of redundancy and performance versus cost of storage allows the user to make decisions separately for each file, and to change those decisions over time, reflecting the changing value of the data stored in a file. For example, when the system 200 is being used to create a sequence of commercials and live program segments to be broadcast, the very first commercial following a halftime break of a sports match can be a particularly expensive commercial. Accordingly, the user may wish to increase the replication factor for such a commercial file temporarily, until after the commercial has been played out, and then reduce the replication factor back down to a suitable level once the commercial has aired.

According to another embodiment of the invention, the content servers 406, 408 in the system 200 are arranged in groups. The groups are used to make decisions on the locations of slice replicas. For example, all of the content servers 406, 408 that are physically in the same equipment rack or enclosure may be placed in a single group. The user can thus indicate to the system 200 the physical relationship between content servers 406, 408, depending on the wiring of the server machines within the enclosures. Slice replicas are then spread out so that no two replicas are in the same group of content servers. This allows the system 200 to be resistant against hardware failures that may encompass an entire rack.

Replication of slices is preferably handled internally between content servers 406, 408. Clients 410 are thus not required to expend extra bandwidth writing the multiple copies of their files. In accordance with an embodiment of the invention, the system 200 provides an acknowledgment scheme where a client 410 can request acknowledgement of a number of replica writes that is less than the actual replication factor for the file being written. For example, the replication factor may be several hundred, such that waiting for an acknowledgment on hundreds of replications would present a significant delay to the client's processing. This allows the client 410 to tradeoff speed of writing verses certainty of knowledge of the protection level of the file data. Clients 410 that are speed sensitive can request acknowledgement after only a small number of replicas have been created. In contrast, clients 410 that are writing sensitive or high value data can request that the acknowledgement be provided by the content servers only after all specified number of replicas have been created.

According to an embodiment of the invention, files are divided into slices when stored in the system 200. In a preferred case, a slice can be deemed to be an intelligent object, as opposed to a conventional disk block or stripe that is used in a typical RAID or storage area network (SAN) system. The intelligence derives from at least two features. First, each slice may contain information about the file for which it holds data. This makes the slice self-locating. Second, each slice may carry checksum information, making it self-validating. When conventional file systems lose metadata that indicates the locations of file data (due to a hardware or other failure), the file data can only be retrieved through a laborious manual process of trying to piece together file fragments. In accordance with an embodiment of the invention, the system 200 can use the file information that are stored in the slices themselves, to automatically piece together the files. This provides extra protection over and above the replication mechanism in the system 200. Unlike conventional blocks or stripes, slices cannot be lost due to corruption in the centralized data structures.

In addition to the file content information, a slice also carries checksum information that may be created at the moment of slice creation. This checksum information is said to reside with the slice, and is carried throughout the system with the slice, as the slice is replicated. The checksum information provides validation that the data in the slice has not been corrupted due to random hardware errors that typically exist in all complex electronic systems. The content servers 406, 408 preferably read and perform checksum calculations continuously, on all slices that are stored within them. This is also referred to as actively checking for data corruption. This is a type of background checking activity which provides advance warning before the slice data is requested by a client, thus reducing the likelihood that an error will occur during a file read, and reducing the amount of time during which a replica of the slice may otherwise remain corrupted.

Figure 5:
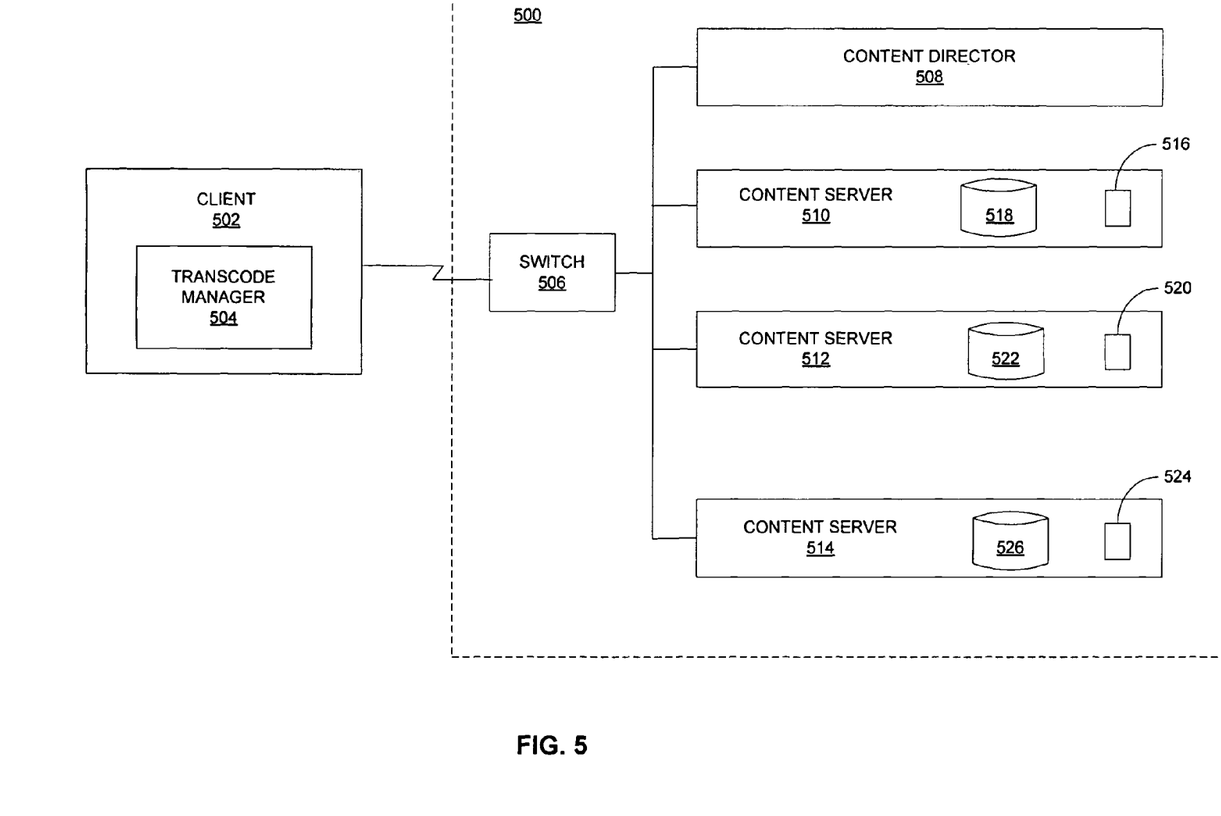
FIG. 5 is a block diagram illustrating a transcoding system in a distributed file system in accordance with one embodiment.

FIG. 5 is a block diagram illustrating a transcoding system in a distributed file system in accordance with one embodiment. A client 502 may have a transcode manager 504. The transcode manager 504 is configured to generate a request to transcode a file to the distributed file system 500. The distributed file system 500 stores portions of the file across distinct physical storage locations. In accordance with one embodiment, the physical storage locations may include content servers 510, 512, and 514. The distributed file system 500 includes a switch 506, a content director 508, and content servers 510, 512, 514. Each content server may be configured to transcode at least a portion of the file from a first format to a second format. For example, audio/video content of a file may be converted from a high resolution format to a low resolution format. Each content server 510, 512, 514 may include respectively a processing unit 516, 520, 524 and a content storage 518, 522, 526 such as a hard drive or a memory.

In accordance with another embodiment, content server 510 may access content server 512 to transcode a portion of the file residing on content server 512. Content server 510 may thus act as a transcoding client on behalf of client 502.

The processing unit of each content server may be used to perform transcoding as long as the transcoding process does not interfere with the primary role of the content server, which is to provide storage. In order to ensure that the processing unit is not abused by the transcoding process, each content server may be partitioned into separate logic portions. For example, a first separate logic portion of a content server may be used exclusively for processing storage functions. A second separate logic portion of the content server may be used for processing transcoding functions. Other logic portions may be used for processing more functions, such as security.

Those of ordinary skills in the art will recognize that the content servers may be partitioned in many ways.

Figure 6:
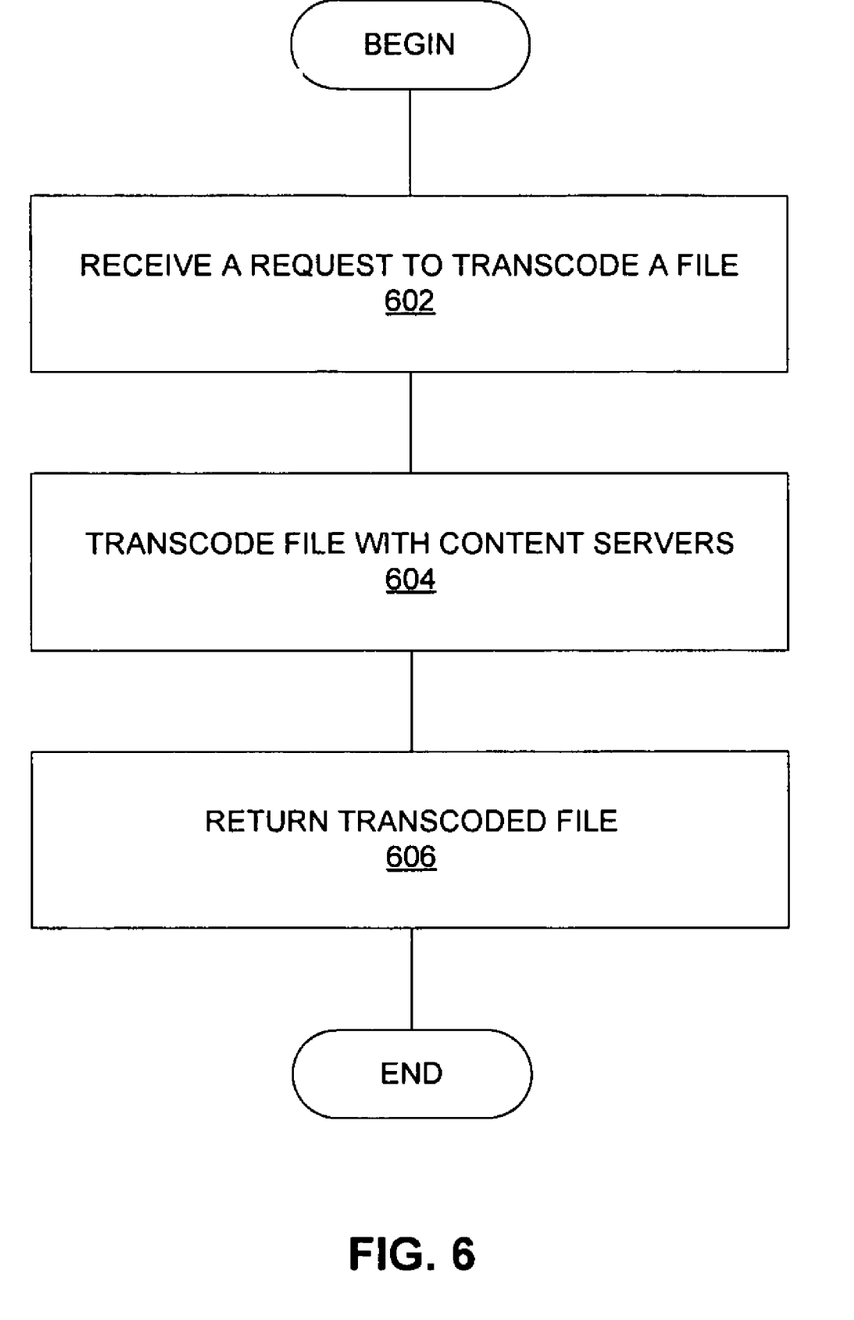
FIG. 6 is a flow diagram illustrating a method for transcoding content in a distributed file system in accordance with one embodiment.

FIG. 6 is a flow diagram illustrating a method for transcoding content in a distributed file system in accordance with one embodiment. At 602, a request to transcode the file is received by the distributed file system. In accordance with one embodiment, a transcode manager of a client generates to the request to transcode the file. The distributed file system stores portions of the file across a plurality of distinct physical storage locations.

At 604, the file is transcoded from a first format to a second format using a processing unit of at least one of the physical storage locations. In accordance with another embodiment, one content server may access another second content server of the distributed file system to transcode a portion of the file. One content server may act as a transcoding client transcoding the file on its own processing unit or on other processing units from the other content servers. The transcoded file may be stored in the file distributed system. In accordance with one embodiment, a first separate logic portion of the content server may be partitioned for processing security functions. A second separate logic portion of the content server may be partitioned for processing transcoding functions.

At 606, the distributed file system sends the transcoded file to the client.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for transcoding a file of a distributed file system, the method comprising:
receiving a request to transcode the file, the distributed file system storing portions of the file across a plurality of distinct physical storage locations; and
wherein one or more of the distinct physical storage locations comprises a processing unit;
in response to the request to transcode the file, transcoding a first portion of the file from a first format to a second format using a processing unit of a first physical storage location of the physical storage locations;
wherein the first portion of the file is less than the entire file;
in response to the request to transcode the file, transcoding a second portion of the file from the first format to the second format using a processing unit of a second physical storage location of the physical storage locations;
wherein the second portion of the file is less than the entire file;
wherein the second portion of the file is a different portion than the first portion of the file;
wherein the second physical storage location is distinct from the first physical storage location.

2. The method of claim 1, further comprising:
storing the file with the second format in the file distributed system.

3. The method of claim 1, further comprising:
receiving the request from a client; and
sending the transcoded file to the client.

4. The method of claim 3, further comprising:
receiving the request from a transcode manager of the client.

5. The method of claim 1, wherein the distributed file system comprises:

a switch;

a content director coupled to the switch; and a plurality of content servers coupled to the content director, the plurality of content servers storing portions of files.

6. The method of claim 1, wherein at least one of the distinct physical storage locations comprises at least one content server.

7. The method of claim 6, wherein each content server further comprises:

a content storage; and a processing unit coupled to the content storage.

8. The method of claim 6, wherein a first content server accesses a second content server to transcode a portion of the file.

9. The method of claim 5, further comprising:

partitioning a first separate logic portion of the content server for processing storage functions.

10. The method of claim 9, further comprising:

partitioning a second separate logic portion of the content server for processing transcoding functions.

11. An apparatus comprising:

a distributed file system storing portions of a file across a plurality of distinct physical storage locations, a first physical storage location comprising a processing unit configured to transcode a first portion of the file from a first format to a second format;

wherein the first portion of the file is less than the entire file;

a second physical storage location comprising a processing unit configured to transcode a second portion of the file from the first format to the second format;

wherein the second portion of the file is less than the entire file;

wherein the second portion of the file is a different portion than the first portion of the file;

wherein the second physical storage location is distinct from the first physical storage location.

12. The apparatus of claim 11, wherein each physical storage location is configured to transcode using a processing unit of at least one of the physical storage locations.

13. The apparatus of claim 11, wherein the distributed file system further comprises:

a switch;

a content director coupled to the switch; and a plurality of content servers coupled to the content director, the plurality of content servers storing portions of the file.

14. The apparatus of claim 11, further comprising:

a client coupled to the distributed file system, the client having a transcode manager configured to generate a request to transcode the file to the distributed file system.

15. The apparatus of claim 13, wherein each content server further comprises:

a content storage; and a processing unit coupled to the content storage.

16. The apparatus of claim 13, wherein a first content server accesses a second content server to transcode a portion of the file.

17. The apparatus of claim 13, further comprising:

a first separate logic portion of the content server partitioned for processing storage functions.

18. The apparatus of claim 17, further comprising:

a second separate logic portion of the content server partitioned for processing transcoding functions.

19. A program storage device readable by a machine, tangibly embodying a program of instructions executable by the machine to perform transcoding a file of a distributed file system by:

receiving a request to transcode the file, the distributed file system storing portions of the file across a plurality of distinct physical storage locations; and wherein one or more of the distinct physical storage locations comprises a processing unit;

in response to the request to transcode the file, transcoding a first portion of the file from a first format to a second format using a processing unit of a first physical storage location of the physical storage locations;

wherein the first portion of the file is less than the entire file;

in response to the request to transcode the file, transcoding a second portion of the file from the first format to the second format using a processing unit of a second physical storage location of the physical storage locations;

wherein the second portion of the file is less than the entire file;

wherein the second portion of the file is a different portion than the first portion of the file;

wherein the second physical storage location is distinct from the first physical storage location.

20. The program storage device of claim 19, further comprising instructions executable by the machine to perform:

storing the file with the second format in the distributed file system.

21. The program storage device of claim 19, further comprising instructions executable by the machine to perform:

receiving the request from a client; and sending the transcoded file to the client.

22. A method for transcoding a file of a distributed file system, the method comprising:

receiving a request to transcode the file, the distributed file system storing portions of the file across a plurality of distinct physical storage locations;

wherein a first distinct physical storage location is configured to transcode the file from a first format to a second format using a processing unit of the first physical storage location;

wherein a second distinct physical storage location is configured to transcode the file from the first format to a second format using a processing unit of the second physical storage location;

in response to the request to transcode the file, transcoding a portion of the file from a first format to a second format using the processing unit of the first physical storage location;

wherein the first distinct physical storage location accesses the portion of the file from the second distinct physical storage location.

23. A program storage device readable by a machine, tangibly embodying a program of instructions executable by the machine to perform transcoding a file of a distributed file system by:

receiving a request to transcode the file, the distributed file system storing portions of the file across a plurality of distinct physical storage locations;

wherein a first distinct physical storage location is configured to transcode the file from a first format to a second format using a processing unit of the first physical storage location;

wherein a second distinct physical storage location is configured to transcode the file from the first format to a second format using a processing unit of the second physical storage location;

in response to the request to transcode the file, transcoding a portion of the file from a first format to a second format using the processing unit of the first physical storage location;

wherein the first distinct physical storage location accesses the portion of the file from the second distinct physical storage location.

* * * * *